United States Patent
Muttik

(10) Patent No.: US 9,864,615 B2
(45) Date of Patent: *Jan. 9, 2018

(54) USER DRIVEN EMULATION OF APPLICATIONS

(71) Applicant: McAfee, Inc., Santa Clara, CA (US)

(72) Inventor: Igor Muttik, Berkhamsted (GB)

(73) Assignee: McAfee, LLC, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/013,574

(22) Filed: Feb. 2, 2016

(65) Prior Publication Data

US 2016/0162307 A1    Jun. 9, 2016

Related U.S. Application Data

(63) Continuation of application No. 13/723,495, filed on Dec. 21, 2012, now Pat. No. 9,274,816.

(51) Int. Cl.
*G06F 9/455* (2006.01)
*G06F 9/445* (2006.01)
(Continued)

(52) U.S. Cl.
CPC ............... *G06F 9/455* (2013.01); *G06F 8/60* (2013.01); *G06F 11/30* (2013.01);
(Continued)

(58) Field of Classification Search
CPC ............. G06F 9/455; G06F 11/30; G06F 8/60
See application file for complete search history.

(56) References Cited

U.S. PATENT DOCUMENTS 7,730,539 B2   6/2010   Murphy et al.
7,849,502 B1   12/2010   Bloch et al.
(Continued)

OTHER PUBLICATIONS

Appthority named finalist for "most innovative company at RSA(R) conference 2012". (Feb. 23, 2012). Business Wire. Retrieved from http://search.proquest.com/docview/9239757593?accountid=14753.
(Continued)

*Primary Examiner* — Abdullahi E Salad
(74) *Attorney, Agent, or Firm* — Blank Rome, LLP

(57) ABSTRACT

Systems and methods allow a user to select one or more applications that are intended to be downloaded to a device (e.g., phone, tablet, PC) and create an emulation environment for testing aspects of the one or more applications prior to download. The emulation environment can be virtual (via emulation or virtual machine) or instrumented by remotely controlling actual hardware. Metrics collected from the emulation environment can include security and usability related aspects of the applications. Interaction between the applications themselves, the applications and other resources, and the user and the applications (e.g., configuration preferences, usage patterns) can be monitored by systems facilitating hosting of the emulation environment. For example, collected metrics can be used to create a measure for security, reputation, user-preference, etc. regarding the applications. Metrics can be shared amongst other potential users to assist in their purchase or usage of the applications.

24 Claims, 6 Drawing Sheets

(51) Int. Cl.
*G06F 11/30* (2006.01)
*G06F 11/34* (2006.01)

(52) U.S. Cl.
CPC ...... *G06F 11/3006* (2013.01); *G06F 11/3438* (2013.01); *G06F 11/3452* (2013.01); *G06F 11/3457* (2013.01)

(56) References Cited

U.S. PATENT DOCUMENTS

| | | |
|---|---|---|
| 7,908,658 B1 | 3/2011 | Oeij |
| 8,112,412 B1 | 2/2012 | Nachenberg |
| 8,205,217 B2 | 6/2012 | Kennedy et al. |
| 8,312,537 B1 | 11/2012 | Nachenberg et al. |
| 8,312,539 B1 | 11/2012 | Nachenberg et al. |
| 8,321,940 B1 | 11/2012 | Pereira et al. |
| 8,336,100 B1 | 12/2012 | Glick et al. |
| 8,499,063 B1 | 7/2013 | Satish et al. |
| 2002/0026396 A1 | 2/2002 | Dent et al. |
| 2003/0046223 A1 | 3/2003 | Crawford et al. |
| 2005/0204002 A1 | 9/2005 | Friend |
| 2006/0212931 A1 | 9/2006 | Shull et al. |
| 2006/0253580 A1 | 11/2006 | Dixon et al. |
| 2007/0240217 A1 | 10/2007 | Tuvell et al. |
| 2008/0005223 A1 | 1/2008 | Flake et al. |
| 2008/0175266 A1 | 7/2008 | Alperovitch et al. |
| 2008/0270104 A1 | 10/2008 | Stratton et al. |
| 2009/0007102 A1 | 1/2009 | Dadhia et al. |
| 2009/0083731 A1 | 3/2009 | Sobel |
| 2009/0234663 A1 | 9/2009 | McCann et al. |
| 2009/0276433 A1 | 11/2009 | Foshack et al. |
| 2010/0058317 A1 | 3/2010 | Braams |
| 2010/0058468 A1 | 3/2010 | Green et al. |
| 2010/0077445 A1 | 3/2010 | Schneider et al. |
| 2010/0011415 A1 | 4/2010 | Cortes et al. |
| 2010/0186088 A1 | 7/2010 | Banerjee et al. |
| 2011/0010759 A1 | 1/2011 | Adler |
| 2011/0162070 A1 | 6/2011 | Krasser et al. |
| 2011/0220710 A1 | 9/2011 | Kurian et al. |
| 2011/0225655 A1* | 9/2011 | Niemela ............ G06F 21/566 726/24 |
| 2013/0014020 A1* | 1/2013 | Dixon ............ G06F 17/30861 715/738 |
| 2013/0073672 A1 | 3/2013 | Ayed |
| 2013/0097659 A1 | 4/2013 | Das et al. |
| 2013/0097706 A1 | 4/2013 | Titonis et al. |
| 2013/0111547 A1 | 5/2013 | Kraemer |
| 2013/0191918 A1 | 7/2013 | Nachenberg |
| 2013/0227636 A1 | 8/2013 | Bettini et al. |
| 2013/0263260 A1 | 10/2013 | Mahaffey et al. |

OTHER PUBLICATIONS

Appthority and appcelerator unvile secure enterprise app development solution. (Feb. 29, 2012). Business Wire. Retrieved from http://search.proquest.com/docview/923975759?accountid=14753.

Appthority and BoxTone partner to deliver mobile app risk management. (Feb. 28, 2012). Business Wire. Retrieved from http://search.proquest.com/docview/923744299?accountid=14753.

Company profile for appthority. (Feb. 24, 2012). Business Wire. Retrieved from http://search.proquest.com/docview/926350382?accountid=14753.

International Search Report and Written Opinion regarding corresponding PCT application No. PCT/US2013/074735, dated Mar. 31, 2014.

* cited by examiner

USER DRIVEN EMULATION OF APPLICATIONS

CROSS-REFERENCE TO RELATED APPLICATIONS

This Non-Provisional application claims the benefit of co-pending U.S. Non-Provisional application Ser. No. 13/723,495, filed Dec. 21, 2012, the entire contents of which is herein incorporated by reference.

TECHNICAL FIELD

This disclosure relates generally to a system and method for creating a remote application environment using user-selected applications and user-defined configuration parameters for the selected applications. More particularly, but not by way of limitation, this disclosure describes a user defining a remote environment for a set of applications prior to actually downloading the one or more applications. After a trial period of the applications in the remote environment, the user can select to purchase and download the applications or determine that a subset of the applications is not desirable. Based on collected metrics, an overall preference/security score (e.g., reputation score) can be calculated and associated with individual applications from information collected across a plurality of different users and usage patterns.

BACKGROUND

Contemporary testing of software applications is performed within the context of the vendor providing the software applications. Testing of interaction of one vendor's applications with the multitude of applications provided by different vendors presents significant problems because the combinations and permutations of available applications cannot reasonably be tested by the actual software vendors. Additionally, each software application has a plurality of user-defined configuration options that can substantially affect how each application behaves for a particular user. This aspect adds to the complexity of a vendor's ability to adequately test each application and does not guarantee to a user that a set of applications will be acceptable for their needs.

Another consideration is the operating environment in which a user might be attempting to use a set of applications. Cell phones, tablets, laptops and other devices have a significant concern about battery life and the power requirements of a set of applications. User defined configuration options can also have an impact in this area.

Security and privacy across applications is yet another concern. Applications can be well behaved when used together or interfere with each other while either simultaneously installed or simultaneously used.

Based on these and other considerations, what is needed is a way for a given user to select and configure a set of applications destined for a particular operating environment prior to making an actual purchase/download decision. Further, information gathered in one user's "test" or "trial" environment can be collected and correlated to provide information about each individual application in an effort to inform other users of potential usability and desirability of particular applications (e.g., a reputation of an application or set of applications).

DETAILED DESCRIPTION

As explained above, testing of applications in realistic user configured environments is difficult because of the number of combinations and permutations of applications, hardware and user configuration settings. Prior art methods of testing include testing performed in an automated manner on a minor subset of all possible configuration combinations. Prior art testing techniques did not allow a user to have a "test run" of one or multiple applications (possibly prior to purchase) in an isolated and monitored environment. As explained further below, techniques are disclosed to address these and other problems by providing an emulated user environment using a virtual environment or an instrumented environment. The instrumented environment is useful for determining operational parameters such as battery drain/life for a user-defined set of applications operating in a real-world manner (i.e., operating in exactly the same fashion because the actual user can be driving the environment). Further, the monitoring parameters learned for one user can be collected and correlated across a plurality of users to determine overall reputation and performance requirements for each application. These monitored parameters can be useful information to guide one or more user's application selection and purchase decisions.

Figure 1:
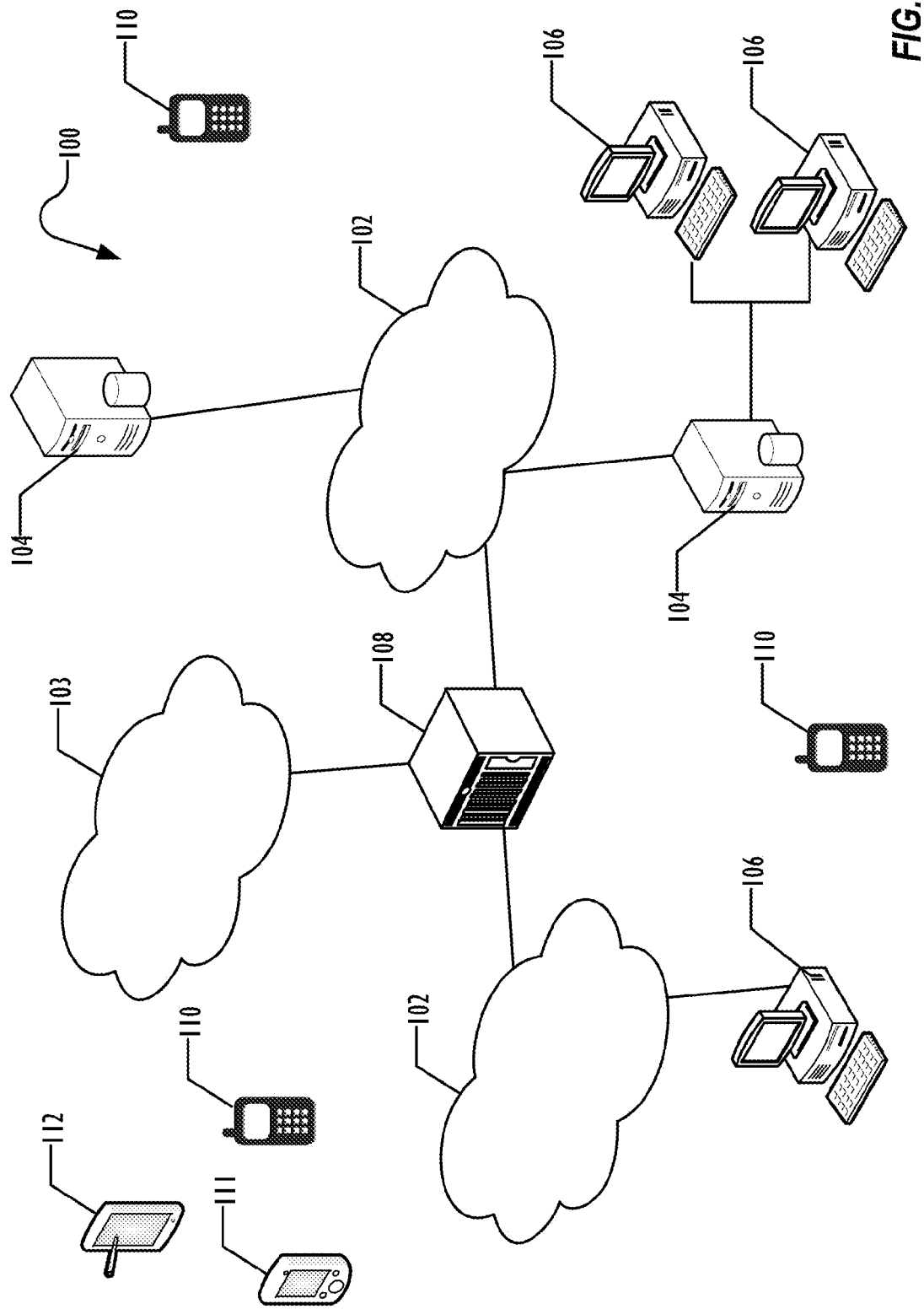
FIG. 1 is a block diagram illustrating network architecture 100 according to one or more disclosed embodiments.

Referring now to FIG. 1, infrastructure 100 is shown schematically. Infrastructure 100 contains computer networks 102. Computer networks 102 include many different types of computer networks available today such as the Internet, a corporate network or a Local Area Network (LAN). Each of these networks can contain wired or wireless devices and operate using any number of network protocols (e.g., TCP/IP). Networks 102 are connected to gateways and routers (represented by 108), end user computers 106 and computer servers 104. Also shown in infrastructure 100 is cellular network 103 for use with cellular communication. As is known in the art, cellular networks support cell phones and many other types of devices (e.g., tablet computers 112, PDA 111 or a lap top computer (not shown)). Cellular devices in the infrastructure 100 are illustrated as cell phones 110. Obviously, cell phones 110 can be smart phones or other devices of similar capabilities.

Figure 2:
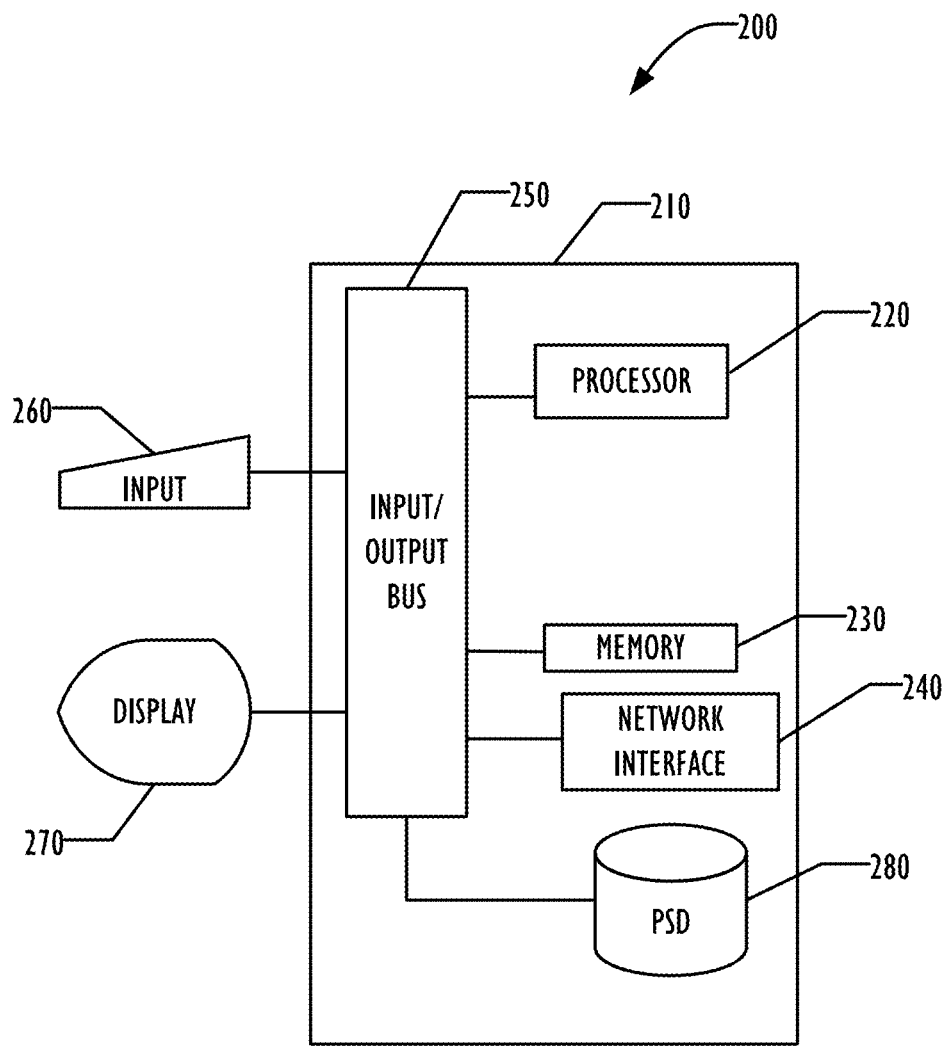
FIG. 2 is a block diagram illustrating a computer with a processing unit which could be configured to provide an emulation environment, facilitate an instrumented environment, act as a processor in an end user device, etc. according to one or more disclosed embodiments.

Referring now to FIG. 2, an example of a processing device 200 for use in providing disclosed user-driven emulation techniques according to one embodiment is illustrated in block diagram form. Processing device 200 may serve as processor in a cellular phone 110, gateway or router 108, client computer 106, or a server computer 104. Example processing device 200 comprises a system unit 210 which may be optionally connected to an input device for system 260 (e.g., keyboard, mouse, touch screen, etc.) and display 270. A program storage device (PSD) 280 (sometimes referred to as a hard disc, flash memory, or computer readable medium) is included with the system unit 210. Also included with system unit 210 is a network interface 240 for communication via a network (either cellular or computer) with other computing and corporate infrastructure devices (not shown) or other cellular communication devices. Network interface 240 may be included within system unit 210 or be external to system unit 210. In either case, system unit 210 may be communicatively coupled to network interface 240. Program storage device 280 represents any form of non-volatile storage including, but not limited to, all forms of optical and magnetic memory, including solid-state, storage elements, including removable media, and may be included within system unit 210 or be external to system unit 210. Program storage device 280 may be used for storage of software to control system unit 210, data for use by the processing device 200, or both.

System unit 210 may be programmed to perform methods in accordance with this disclosure. System unit 210 comprises one or more processing units (represented by Processor 220), input-output (I/O) bus 250, and memory 230. Access to memory 230 can be accomplished using the communication bus 250. Processing unit 220 may include any programmable controller device including, for example, a mainframe processor, a cellular phone processor, or one or more members of the Intel Atom®, Core®, Pentium® and Celeron® processor families from Intel Corporation and the Cortex and ARM processor families from ARM. (INTEL, INTEL ATOM, CORE, PENTIUM, and CELERON are registered trademarks of the Intel Corporation. CORTEX is a registered trademark of the ARM Limited Corporation. ARM is a registered trademark of the ARM Limited Company). Memory 230 may include one or more memory modules and comprise random access memory (RAM), read only memory (ROM), programmable read only memory (PROM), programmable read-write memory, and solid-state memory. Processor 220 may also include some internal memory including, for example, cache memory or memory dedicated to a particular processing unit and isolated from other processing units.

Processing device 200 may have resident thereon any desired operating system. Embodiments of disclosed detection techniques may be implemented using any desired programming language, and may be implemented as one or more executable programs, which may link to external libraries of executable routines that may be supplied by the provider of the detection software/firmware, the provider of the operating system, or any other desired provider of suitable library routines. As used herein, the term "a computer system" can refer to a single computer or a plurality of computers working together to perform the function described as being performed on or by a computer system.

In preparation for performing disclosed embodiments on processing device 200, program instructions to configure processing device 200 to perform disclosed embodiments may be provided stored on any type of non-transitory computer-readable media, or may be downloaded from a server 104 onto program storage device 280. It is important to note that even though Processor 220 is shown on a single processing device 200 it is envisioned and may be desirable to have more than one processing device 200 in a device configured according to disclosed embodiments.

Figure 3:
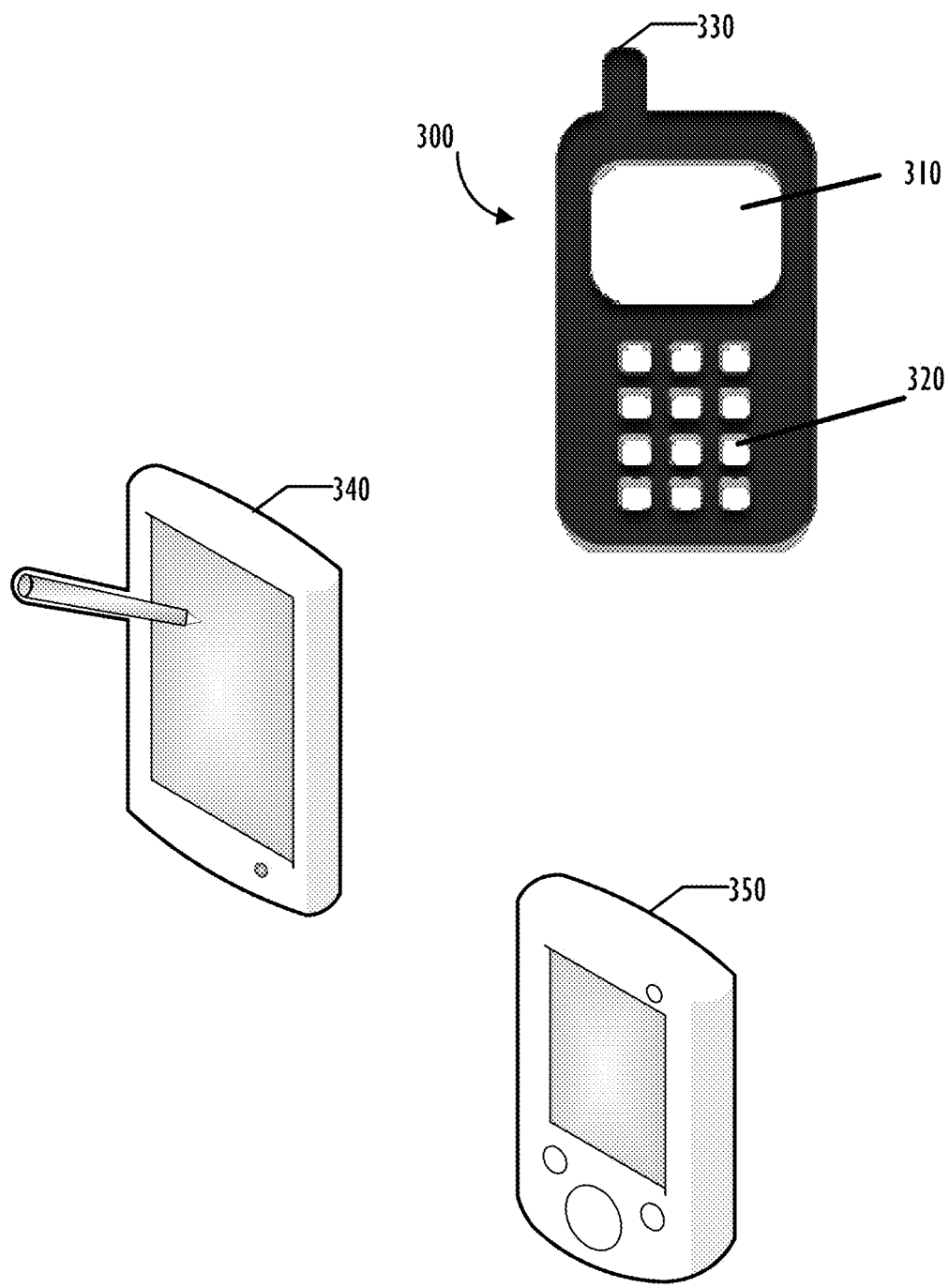
FIG. 3 is an illustration of a cellular phone (e.g., smart phone), tablet or Personal Data Assistant (PDA) that could be used according to one or more disclosed embodiments.

Referring now to FIG. 3, cellular phone 300 (an example of cellular devices 110 from FIG. 1) is shown. Tablet device 340 and Personal Digital Assistant (PDA) 350 represent examples of end-user devices 112 and 111 from networks 102 and 103. Embodiments of user devices practicing the disclosed techniques either can be portable devices like these or can consist of a device similar to a personal computer (e.g., 106). Each of the end user devices has a user interface screen (e.g., 310), a user input mechanism (e.g., 320), and a network communication device (e.g., antenna 330) or network interface card (not shown). End user devices such as cellular phone 300 can also have multiple antennas for cellular, Wi-Fi, radio frequency identification (RFID), near field communication (NFC), etc.

We now turn to a discussion of various embodiments to provide user driven emulation of applications to overcome some of the previously explained difficulties regarding testing the vast configuration possibilities of user applications and devices. As will be explained below, a user-interface of a user controlled device (e.g., via web browser) can connect to the remote infrastructure disclosed herein and control selection and configuration of a set of applications. While the environment is being provided, backend servers can monitor the activities and gather useful information regarding security of applications and other parameters.

Figure 4:
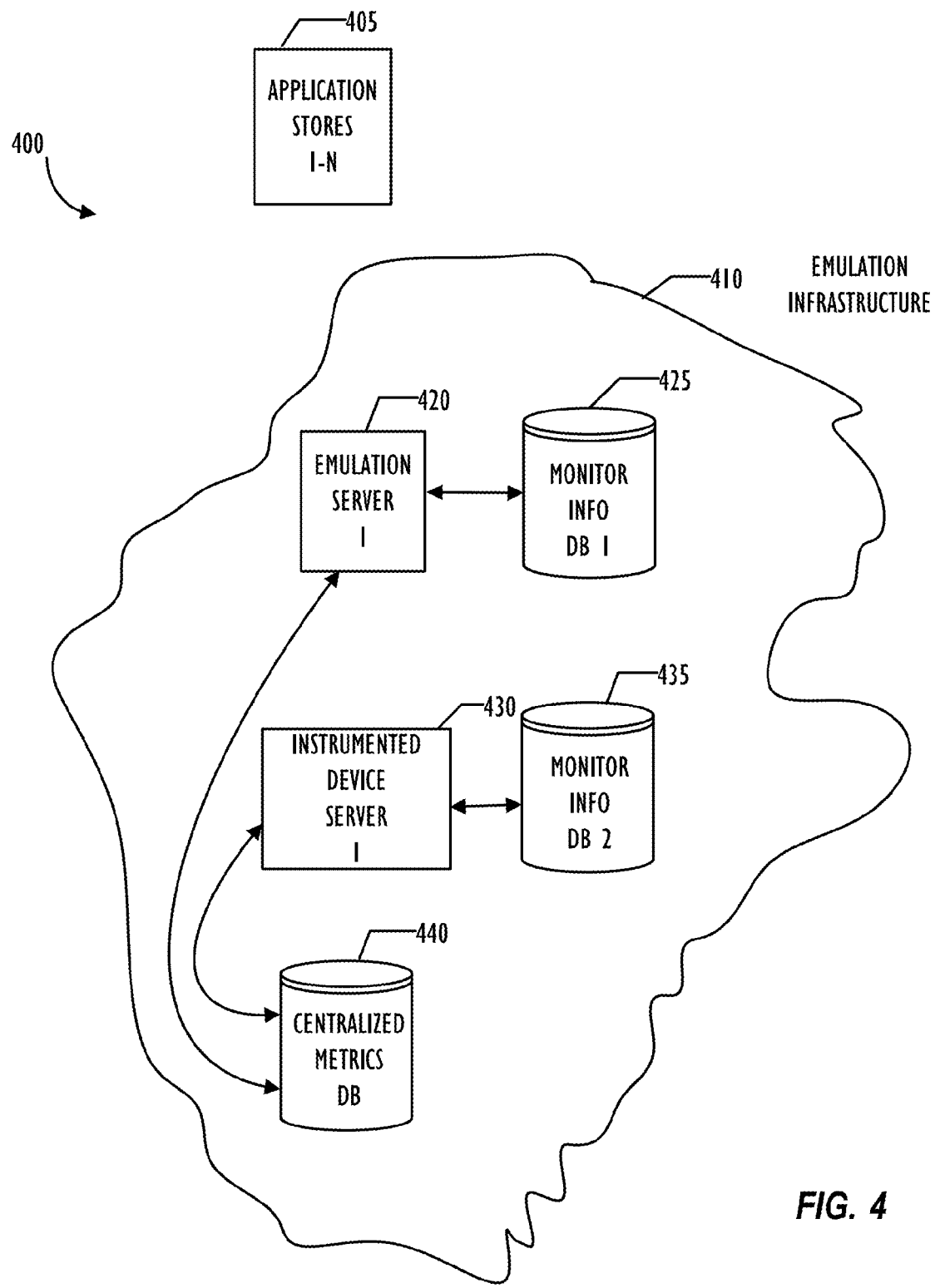
FIG. 4 is a network architecture showing an emulation infrastructure and a set of applications stores from potentially different software application vendors according to one or more disclosed embodiments.

Referring now to FIG. 4, block diagram 400 illustrates one or more Application stores 1-N 405 and an Emulation Infrastructure 410 configured according to disclosed embodiments. Application stores 1-N 405 represent a plurality of locations to provide either free or purchased applications for end users. Application stores 1-N 405 can be provided by the same or different application vendors.

Emulation Infrastructure 410 includes a plurality of devices to support the disclosed emulation of application techniques. Emulation Server 1 (420) represents a device configured to host an environment for a user using one of the end user devices described in infrastructure 100 of FIG. 1. Emulation Server 1 (420) is connected to Monitor Information Data Base 1 425 where collected information can be saved. Monitoring information can be gathered on Emulation Server 1 (420), a server supporting Monitor Information Data Base 1 (425), or other computers (not shown) participating in Emulation Infrastructure 410.

Instrumented Device Server 1 (430) represents a server connected to a plurality of physical devices (not shown) that can be controlled and monitored to collect parameters not typically available or not as accurately measured in an emulation environment. For example, battery life relative to a configuration of applications might be more accurately measured when an actual physical battery is utilized rather than being approximated through emulation. Other parameters (such as the actual CPU utilization and heating profile of the device components) also lend themselves to more precise measurement in an instrumented environment. Monitor Information Data Base 2 (435) is connected to Instrumented Device Server 1 (430) to collect and store information monitored in the instrumented device environment. Centralized Metrics Data Base 440 is communicatively coupled to other servers (420+425 pair and/or 430+435 pair) in Emulation Infrastructure 410 to store collected information and calculated information derived from the collected information via processes described further below.

Although Emulation Infrastructure 410 shows a single Emulation Server 1 (420) and a single Instrumented Device Server 1 (430), either a single server can be used or a plurality of supporting servers of different configurations could be included in Emulation Infrastructure 410.

Figure 5:
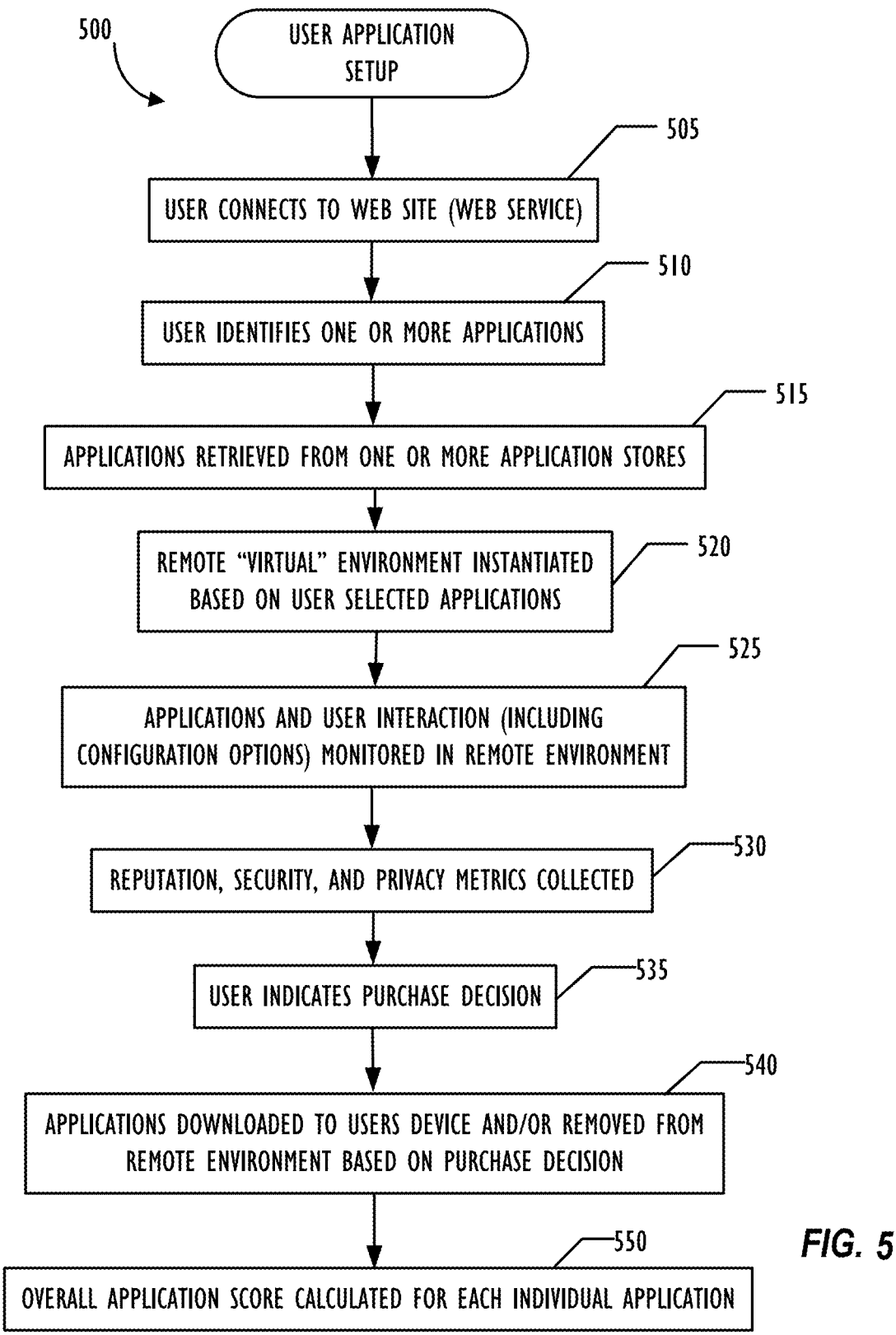
FIG. 5 is a flowchart of a process for creating and monitoring a remote environment of a set of user selected applications according to one or more disclosed embodiments.

Referring now to FIG. 5, process 500 illustrates a possible user application setup in the context of the Emulation Infrastructure 410. Beginning at block 505 a user connects to a portal, possibly implemented as a network/web service, to connect to an emulation environment supported on Emulation Infrastructure 410. The portal providing this service could be either internal to or external from (but communicatively connected to) Emulation Infrastructure 410. Also, either one of Emulation Server 1 (420) or Instrumented Device Server 1 (430) could be configured to provide the described web service.

At block 510, the user selects one or more applications to load into a defined emulation environment supported on Emulation Infrastructure 410. The one or more applications can be selected from one or more application stores provided by one or more application store vendors (e.g., Application Stores 1-N 405 of FIG. 4). At block 515, the selected applications can be retrieved from their respective application stores. At block 520, the remote "virtual" environment can be instantiated in Emulation Infrastructure 410 based on the user-selected applications and a user identified environment.

It may be beneficial for the Emulation Infrastructure 410 to keep the individual user settings/selections/choices/options (including the device, OS, app or apps used) so that when the same user reconnects they are able to operate and optionally further configure a previously configured environment without having to start from the beginning. The saved environment could be re-invoked if it is still available or it can be automatically recreated using stored information.

At block 525, the user interacts with and configures the application in the remote environment. A user can configure the application via an end user device in many ways, including receiving input from a touch screen, keyboard, verbal commands or gestures. While the user is using the applications, comprehensive monitoring can be performed by the servers supporting the instantiated emulation environment. Comprehensive monitoring can include monitoring of user interaction with selected applications, interaction between the selected applications, and load (processor, memory, storage, network and power) required to support the usage pattern. Monitoring also includes monitoring applications for security concerns such as malicious activity or violation of privacy concerns. For example, one of the plurality of applications may interact inappropriately with the other application(s) or the operating system by attempting to access memory or data in an attempt to gain information not intended for the application. Such a violation could indicate that the application contains code configured as malware, spyware, or even a virus. Monitoring can include either static or dynamic analysis or a combination of both. Static analysis includes analyzing the code and associated data flows. Dynamic analysis includes running an application and monitoring it as it executes. Dynamic analysis without user interaction is sub-optimal because to see the true application behavior one requires realistic user input. Application behavior can be altered by user input and run-time user choices. Using information collected during monitoring, a reputation score could be calculated for each application. Reputation metrics 530 collected in Emulation Infrastructure 410 can reflect various properties of an application: battery consumption, security (presence of malicious actions or vulnerable code), quality (e.g. measured by the number of observed crashes or inter-app conflicts), privacy risks (if an app stores the data encrypted or not, locally or in the cloud), level of annoyance (excessive pop-ups in adware-supported apps can be very annoying), network utilization (amount of traffic is an important metric as the volume of network data may affect the ongoing cost of using an application), even user choices (if a number of users relative to a threshold uninstalled a particular application or a set of related applications in the monitored environment, an indication of inadequate quality could be considered). Collection of metrics in 530 and aggregating them into centralized metrics database 440 (as well as analyzing them individually or jointly and presenting to the user) can be done in parallel with the monitoring in step 525. The reputation score could be used to inform potential users of the reputation of the application and assist their download or purchase choices on real devices outside of the Emulation Infrastructure 410. The reputation score could be a numerical value or calculated from a graduated scale of ratings (e.g., good/bad or A, B, C, D as used in school grades). Steps 535, 540 and 550 are optional steps that may not be performed every time through process 500. For example, a user could monitor and assess applications for a prolonged period of time (involving multiple sessions). Also, a user is free to stop at any point and therefore is not obligated to take steps 535, 540 and 550.

In the disclosed embodiments, a user is using an end user device to define and control the operational environment. In addition to monitoring actual interaction between user and environment, the monitored emulation environment could intercept both upload and download requests so that the back end systems can monitor and control interaction of applications with the local network and/or Internet. This monitoring can include any of the disclosed monitoring techniques as well as any other monitoring or analysis techniques.

Figure 6:
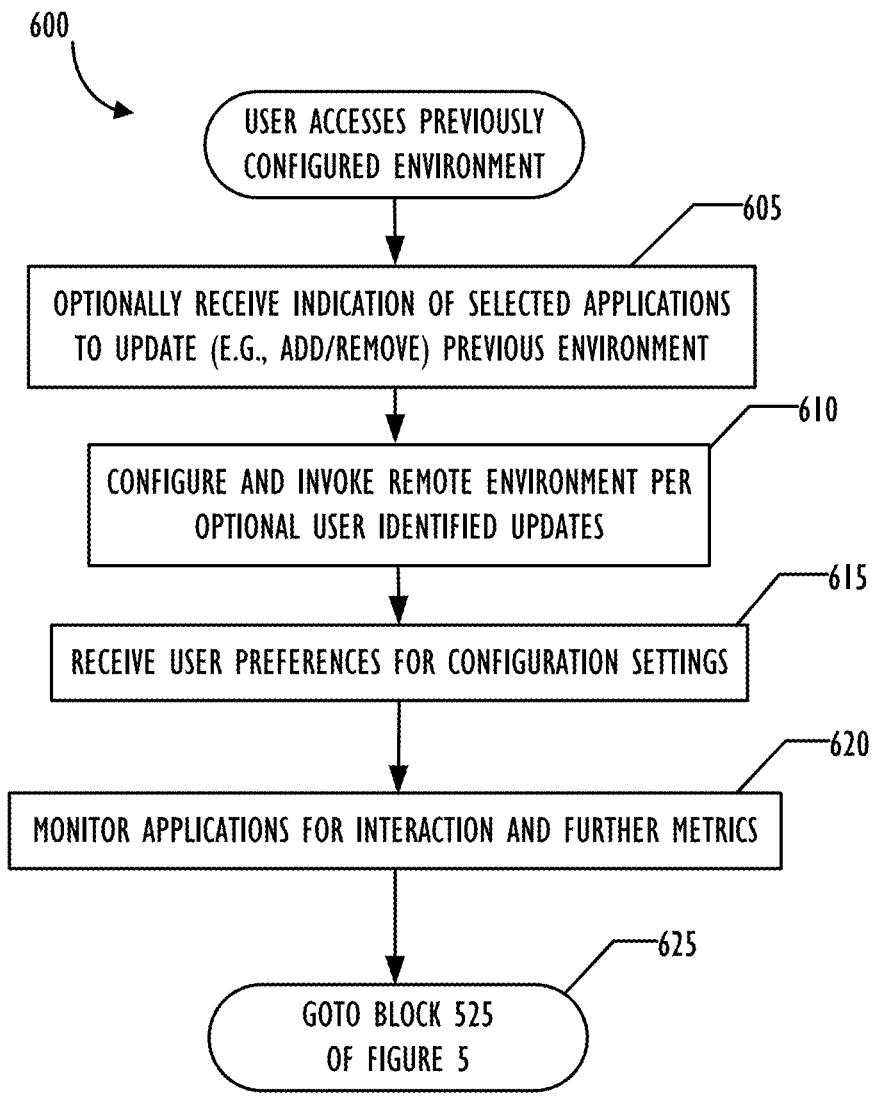
FIG. 6 is a flowchart of a process for a user revisiting (e.g., reconnecting to) and further using a previously configured environment according to one or more disclosed embodiments.

Referring now to FIG. 6, an embodiment of a user reconnecting and further configuring or using a previously defined environment is illustrated. Process 600 shows how a remote user might further interact with an emulation environment. At block 605, the system(s) from Emulation Infrastructure 410 supporting an emulation environment can receive an indication of a user and their previously configured environment and further can receive an indication if the user would like to add or remove applications relative to the previously configured environment. At block 610, the emulation environment can be retrieved (if still available) or automatically re-instantiated using previously stored information and then have newly identified configuration changes applied. At block 615, a user can further alter and configure the emulation environment as needed. Monitoring can be performed (e.g., at block 620) in a similar manner to that described above with respect to FIG. 5 and flow can return to block 525 of FIG. 5 (625). It should be noted that a user could connect and configure an emulation environment from a first device and then reconnect and interact with that same environment from a second different device. Neither the first device nor the second different device needs to conform to the characteristics of the device being emulated. Therefore, the emulation environment could retain all characteristics of the actual device being emulated, which could be different from the end user device being used to interact with the environment at any given time.

In the foregoing description, for purposes of explanation, numerous specific details are set forth in order to provide a thorough understanding of the disclosed embodiments. It will be apparent, however, to one skilled in the art that the disclosed embodiments may be practiced without these specific details. In other instances, structure and devices are shown in block diagram form in order to avoid obscuring the disclosed embodiments. References to numbers without subscripts or suffixes are understood to reference all instance of subscripts and suffixes corresponding to the referenced number. Moreover, the language used in this disclosure has been principally selected for readability and instructional purposes, and may not have been selected to delineate or circumscribe the inventive subject matter, resort to the claims being necessary to determine such inventive subject matter. Reference in the specification to "one embodiment" or to "an embodiment" means that a particular feature, structure, or characteristic described in connection with the embodiments is included in at least one disclosed embodiment, and multiple references to "one embodiment" or "an embodiment" should not be understood as necessarily all referring to the same embodiment.

It is also to be understood that the above description is intended to be illustrative, and not restrictive. For example, above-described embodiments may be used in combination with each other and illustrative process steps may be performed in an order different than shown. Many other embodiments will be apparent to those of skill in the art upon reviewing the above description. The scope of the invention therefore should be determined with reference to the appended claims, along with the full scope of equivalents to which such claims are entitled. In the appended claims, terms "including" and "in which" are used as plain-English equivalents of the respective terms "comprising" and "wherein."

What is claimed is:

1. An emulation server comprising:
one or more processors;
one or more network communication interfaces; and
a memory communicatively coupled to the one or more processors, instructions that when executed by at least some of the one or more processors cause the emulation server to:
receive, from a user device, a request associated with an end user identity to instantiate an emulation environment for a selected application;
instantiate an emulation environment based at least in part on the end user identity and the application;
configure the application in the emulation environment based at least in part on input from the user device;
collect user reputation metrics for the application based on user interaction activity in the emulation environment;
calculate a reputation score for the application based on the user reputation metrics; and
provide the reputation score to a second user device in association with the application.

2. The emulation server of claim 1, wherein the instructions further comprise instructions that when executed cause the emulation server to add to the emulation environment an additional application to be transmitted to the user device responsive to a user request.

3. The emulation server of claim 1, wherein the instructions further comprise instructions that when executed cause the emulation server to delete from the emulation environment an application to be transmitted to the user device responsive to a user purchase decision.

4. The emulation server of claim 1, wherein the user reputation metrics comprise information for one or more properties of the application.

5. The emulation server of claim 1, wherein the instructions further comprise instructions that when executed cause the emulation server to combine the user reputation metrics for the application with additional reputation metrics for one or more additional applications to be transmitted to the user device.

6. The emulation server of claim 1, wherein the instructions that when executed cause the emulation server to instantiate the emulation environment comprise instructions that when executed cause the emulation server to access a previously configured emulation environment.

7. The emulation server of claim 1, wherein the emulation environment comprises a virtual environment.

8. The emulation server of claim 1, wherein the emulation environment comprises an instrumented environment.

9. The emulation server of claim 1, wherein the instructions that when executed cause the emulation server to calculate the reputation score comprise instructions that when executed cause the emulation server to determine a rating for the application from a graduated scale of rating values.

10. A non-transitory computer readable medium comprising instructions stored thereon that when executed cause at least one or more processors to:
receive, from a user device, a request associated with an end user identity to instantiate an emulation environment for a selected application;
instantiate an emulation environment based at least in part on the end user identity and the application;
configure the application in the emulation environment based at least in part on input from the user device;
collect user reputation metrics for the application based on user interaction activity in the emulation environment;
calculate a reputation score for the application based on the user reputation metrics; and
provide the reputation score to a second user device in association with the application.

11. The non-transitory computer readable medium of claim 10, wherein the instructions further comprise instructions that when executed cause at least some of the one or more processors to add to the emulation environment an additional application to be downloaded to the user device responsive to a user request.

12. The non-transitory computer readable medium of claim 11, wherein the instructions further comprise instructions that when executed cause the at least one or more processors to delete an application from the emulation environment responsive to a user purchase decision.

13. The non-transitory computer readable medium of claim 10, wherein the user reputation metrics comprises information for one or more properties of the application.

14. The non-transitory computer readable medium of claim 10, wherein the instructions that when executed cause at least some of the one or more processors to calculate the reputation score comprise instructions that when executed cause at least some of the at least one or more processors to combine the user reputation metrics for the application with additional reputation metrics for one or more additional applications to be downloaded to the user device.

15. The non-transitory computer readable medium of claim 10, wherein the instructions that when executed cause at least some of the one or more processors to instantiate the emulation environment comprise instructions that when executed cause at least some of the one or more processors to access a previously configured emulation environment.

16. The non-transitory computer readable medium of claim 10, wherein the emulation environment comprises a virtual environment or an instrumented environment.

17. A method of operating a computer system, the method comprising:

receiving, from a user device, a request associated with an end user identity to instantiate an emulation environment for a selected application;

instantiating an emulation environment based at least in part on the end user identity and the application;

configuring the application in the emulation environment based at least in part on input from the user device;

collecting user reputation metrics for the application based on user interaction activity in the emulation environment;

calculating a reputation score for the application based on the user reputation metrics; and providing the reputation score to a second user device in association with the application.

18. The method of claim 17, further comprising adding to the emulation environment an additional application to be downloaded to the user device responsive to a user request.

19. The method of claim 17, further comprising deleting from the emulation environment an application to be downloaded to the user device responsive to a user purchase decision.

20. The method of claim 17, wherein collecting user reputation metrics further comprises collecting information for one or more properties of the application.

21. The method of claim 17, further comprising combining the user reputation metrics for the application with additional reputation metrics for one or more additional applications to be downloaded to the user device.

22. The method of claim 17, wherein instantiating the emulation environment comprises accessing a previously configured emulation environment.

23. The method of claim 17, wherein instantiating the emulation environment comprises instantiating the emulation environment as a virtual environment or an instrumented environment.

24. The method of claim 17, further comprising determining a rating for the application from a graduated scale of rating values.

* * * * *